(12) United States Patent
Kissinger et al.

(10) Patent No.: US 11,162,821 B2
(45) Date of Patent: Nov. 2, 2021

(54) FIBRE OPTIC SENSING DEVICE

(71) Applicant: Cranfield University, Cranfield (GB)

(72) Inventors: Thomas Kissinger, Cranfield (GB); Ralph Peter Tatam, Cranfield (GB)

(73) Assignee: Cranfield University, Cranfield (GB)

( * ) Notice: Subject to any disclaimer, the term of this patent is extended or adjusted under 35 U.S.C. 154(b) by 0 days.

(21) Appl. No.: 16/763,709

(22) PCT Filed: Nov. 8, 2018

(86) PCT No.: PCT/GB2018/053235
§ 371 (c)(1),
(2) Date: May 13, 2020

(87) PCT Pub. No.: WO2019/092442
PCT Pub. Date: May 16, 2019

(65) Prior Publication Data
US 2020/0300672 A1 Sep. 24, 2020

(30) Foreign Application Priority Data

Nov. 13, 2017 (GB) ..................................... 1718738

(51) Int. Cl.
*G01D 5/353* (2006.01)
*G01D 5/26* (2006.01)
*G01H 9/00* (2006.01)

(52) U.S. Cl.
CPC ......... *G01D 5/35306* (2013.01); *G01D 5/268* (2013.01); *G01D 5/353* (2013.01); *G01D 5/35316* (2013.01); *G01H 9/004* (2013.01)

(58) Field of Classification Search
CPC .... G01D 5/35306; G01D 5/353; G01D 5/268; G01D 5/35316; G01H 9/004
See application file for complete search history.

(56) References Cited

U.S. PATENT DOCUMENTS

| | | | |
|---|---|---|---|
| 4,763,009 A * | 8/1988 | Fevrier | G01D 5/268 250/227.18 |
| 6,640,647 B1 * | 11/2003 | Hong | G01D 5/35316 73/800 |

(Continued)

FOREIGN PATENT DOCUMENTS

| | | |
|---|---|---|
| CN | 105806380 A | 7/2016 |
| EP | 1524509 A1 | 4/2005 |

(Continued)

OTHER PUBLICATIONS

PCT International Search Report and Written Opinion, Application No. PCT/GB2018/053235, dated Feb. 14, 2019.

(Continued)

*Primary Examiner* — Dominic J Bologna
(74) *Attorney, Agent, or Firm* — MacMillan, Sobanski & Todd, LLC

(57) ABSTRACT

A fibre optic sensing device is provided. The fibre optic sensing device includes a plurality of optical fibre portions, wherein each optical fibre portion is arranged to receive laser light from a common laser and reflect the laser light to a common detector. Each optical fibre portion includes a first reflector spaced from a distal end of the optical fibre portion and a second reflector at the distal end. Each optical fibre portion also includes a sensor provided at the distal end of the optical fibre portion. The sensor includes a third reflector the position of which varies depending on a value of a property being sensed. A distance between the first and second reflectors is different for each of the optical fibre portions.

21 Claims, 5 Drawing Sheets

(56) References Cited

U.S. PATENT DOCUMENTS

| | | | |
|---|---|---|---|
| 8,909,040 B1* | 12/2014 | Parker, Jr. ........... | G01M 5/0016 398/25 |
| 2005/0111793 A1* | 5/2005 | Grattan ................... | G01L 1/242 385/37 |
| 2006/0076476 A1* | 4/2006 | Thingbo ............ | G01D 5/35387 250/227.23 |
| 2008/0018904 A1 | 1/2008 | Waagaard et al. | |
| 2015/0268216 A1* | 9/2015 | Chavez ................ | G01N 33/227 436/156 |
| 2016/0258743 A1 | 9/2016 | Yao | |

FOREIGN PATENT DOCUMENTS

| | | |
|---|---|---|
| GB | 2406166 A | 3/2005 |
| WO | 33098156 A1 | 11/2003 |

OTHER PUBLICATIONS

Patents Act 1977: Search Report under Section 17(5), Application No. GB1718738.6, dated May 1, 2018.
International Preliminary Report on Patentability, Application No. PCT/GB2018/053235, dated May 19, 2020.

* cited by examiner

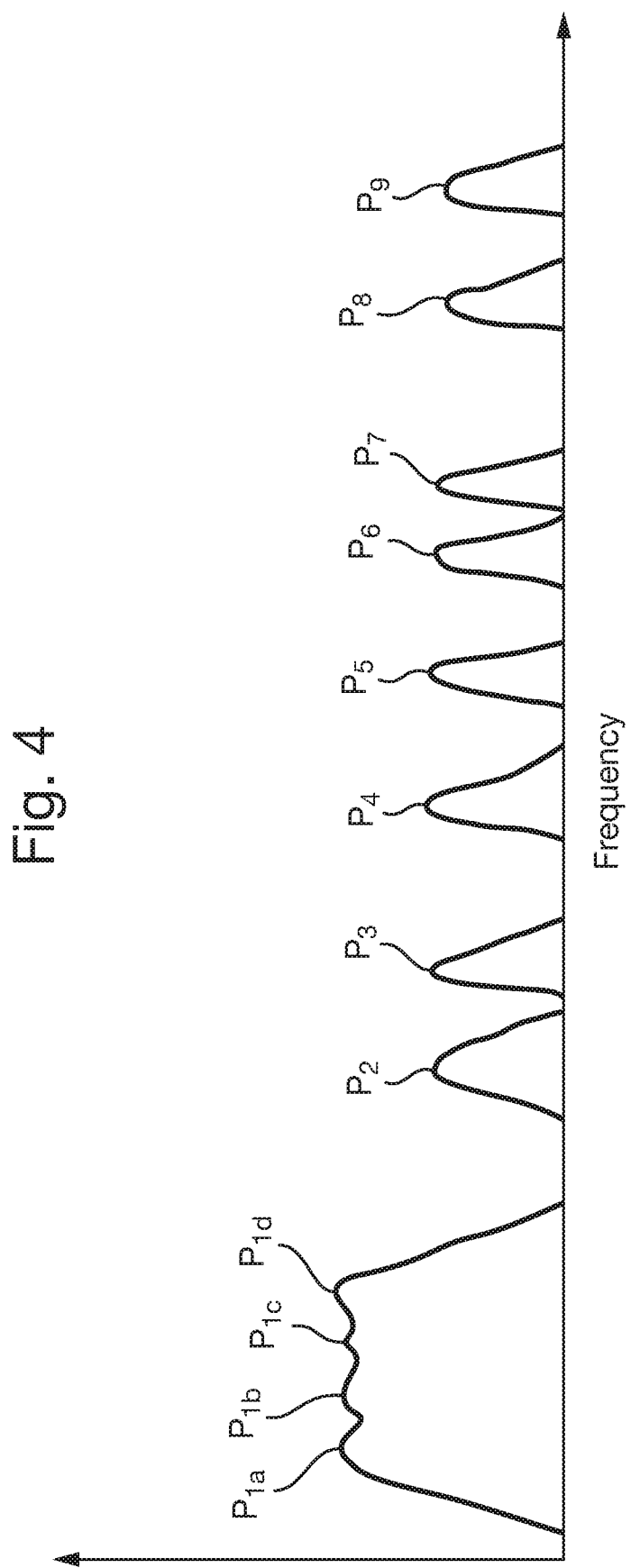

FIBRE OPTIC SENSING DEVICE

TECHNICAL FIELD

The present disclosure relates to a fibre optic sensing device and is particularly, although not exclusively, concerned with a fibre optic sensing device configured to provide improved multipoint measurements.

BACKGROUND

Existing interferometric systems for performing multipoint vibration analysis of one or more bodies include one or more lasers arranged to provide light to a plurality of interferometric vibration sensors. Light reflected by each of the interferometric vibration sensors is received by a respective detector associated with the interferometric vibration sensor and the signals are processed to determine the vibration of a corresponding point on the body.

The use of individual detectors and, optionally, individual lasers for each measurement point enables the measurements from each interferometric vibration sensor to be distinguished from one another.

If it is desirable to measure the vibrations of an increased number of points or bodies, additional lasers and detectors are provided within the system together with the additional vibration sensors.

Such multipoint vibration measurement systems can therefore rapidly increase in size and complexity as well as cost, as the number of measurement points increases.

STATEMENTS OF INVENTION

According to an aspect of the present disclosure, there is provided a fibre optic sensing device comprising a plurality of optical fibre portions, wherein each optical fibre portion is arranged to receive laser light from a common laser and reflect the laser light to a common detector, wherein each optical fibre portion comprises a first reflector spaced from a distal end of the optical fibre portion and a second reflector at the distal end, wherein each optical fibre portion comprises a sensor provided at the respective distal end of the optical fibre portion, the sensor comprising a third reflector, wherein a distance between the first and second reflectors is different for each of the optical fibre portions.

The word "distance" used in this specification may refer to optical path length distance, e.g. along an optical fibre.

Use of the word reflector in this specification encompasses both partial and total reflectors that reflect at least a portion of light of any wavelength, or light within a predetermined range of wavelengths, that falls incident on the reflector.

The sensor may be configured such that a physical property between the second and third reflectors varies depending on a parameter being sensed. The physical property may be one or more of dimension (e.g. distance between second and third reflectors), refractive index and absorption (e.g. of matter between second and third reflectors).

For example, the sensor may comprise a temperature sensor comprising an optical material which expands according to temperatures, or a magnetic field sensor comprising on optically transparent material exhibiting a Faraday effect.

The position of the third reflector may vary, e.g. relative to the second reflector, depending on a value of a property being sensed.

Differences in the path length of the light between the laser and each of the respective optical fibre portions may be arbitrary.

In some arrangements, the distance between the first and second reflectors of each optical fibre portion may differ from the other optical fibre portions by a different multiple of an offset distance. For example, the distance between the first and second reflectors of each subsequent optical fibre portion provided in the sensing device may differ from the previous optical fibre portion by the offset distance. The offset distance may be greater than a maximum distance between the second the third reflectors of one, more than one or each of the optical fibre portions, e.g. when the sensor is detecting a maximum or minimum value.

Two or more of the sensors may be similar, e.g. of similar construction. For example, the sensors may be provided such that the distances between the second and third reflectors of the two or more sensors are substantially the same when the same value of the property is being sensed.

The first reflector may comprise a Bragg grating, a fibre void or an element of reflective material provided within the optical fibre portion. Alternatively the reflector may be any other suitable reflector.

The second reflector may comprise a fibre end surface of the optical fibre portion. The sensor, e.g. the third reflector of the sensor, may be arranged beyond the end of the fibre, e.g. outside of the fibre.

The sensors may be displacement or vibrations sensors. The third reflector may be provided on a surface of a body, the displacement or vibration of which is being measured.

Alternatively, the sensors may be pressure sensors. The third reflector may be provided on a surface, such as a diaphragm or membrane of the pressure sensor, the position of which varies as the pressure varies.

Alternatively again, the sensors may be temperature sensors, magnetic field sensors or sensors configured to measure any other desirable parameter. The sensors may be a combination of different types of sensors, e.g. configured to measure two or more different parameters.

The optical fibre portions may be arranged in series with one another, e.g. such that the laser light passes through each of the optical fibre portions sequentially. For example, the distal end of a first one of the optical fibre portions may be coupled to the proximal end of a next optical fibre portion.

Additionally or alternatively, one or more of the optical fibre portions may be arranged in parallel with one another, e.g. such that the laser light is split in order to be supplied to the fibre optic portions.

The sensing device may further comprise an optical fibre configured to supply the laser light to the optical fibre portions. The optical fibre portions may be coupled to the optical fibre at the proximal ends of the optical fibre portions.

One, more than one or each of the optical fibre portions may branch from the optical fibre. The optical fibre portions may branch from one or more points along the optical fibre.

One or more of the optical fibre portions may branch from others of the optical fibre portions, e.g. between the proximal and distal end of the optical fibre portions. For example, one or more of the optical fibre portions may branch from others of the optical fibre portions between proximal ends of the optical fibre portions and the first reflectors. In some arrangements, two or more first optical fibre portions may branch from the optical fibre, and one or more second optical fibre portions may branch from the first optical fibre portions.

The optical fibre may comprise one or more branch points, such that the optical fibre comprises a plurality of branches extending to a plurality of distal ends of the optical fibre respectively. One or more of the optical fibre portions may be coupled to the distal ends of the optical fibre at the distal ends, e.g. with one or more optical fibre portions being coupled at one, more than one or each of the distal ends.

The optical fibre may branch into two branches at each of the branch points. Alternatively, the optical fibre may branch into three, four or more than four branches at one or more of the branch points.

One or more of the optical fibre portions may branch from the optical fibre at different points along the length of the optical fibre. For example, each of the optical fibre portions may branch from the optical fibre at a different point along the length of the optical fibre. A coupling ratio of the light from the optical fibre to the optical fibre portion may vary at the points along the length of the optical fibre. For example, the coupling ratio may be lower at a shorter distance along the optical fibre, and higher at a greater distance along the optical fibre, such that the intensity of light provided to and/or received from each optical fibre portion is substantially the same, e.g. such that the interferometric signal includes detectable signals from each of the sensors.

An optical interferometry system may comprise, a laser and the above mentioned fibre optic sensing device.

The optical interferometry system may further comprise a modulator configured to apply optical frequency modulation to the laser. The modulator may be configured to apply linear, e.g. triangular or saw tooth, or sinusoidal modulation to the laser. The laser may comprise the modulator.

The optical interferometry system may be configured as a self-referencing interferometry system. In a self-referencing system all desired interference signals are due to mutual interference between the light reflected from desired pairs of reflectors present within the fibre optic sensing device. Alternatively, an interrogation unit of the optical interferometry system may provide a separate interferometric reference arm outside of the fibre optic sensing device and all desired interference signals are due to the mutual interference of light from this reference arm with the light reflected from the desired reflectors.

The optical interferometry system may further comprise a common detector configured to receive an interferometric signal, e.g. a multiplexed interferometric signal, from the optical fibre portions.

The optical interferometry system may further comprise a controller configured to process an interferometric signal using a range-resolved interferometry technique. In other words, the controller may be configured to distinguish between the readings from the sensors based on optical path differences associated with the sensors. For example, the controller may be configured to modulate the light supplied by the laser using an optical frequency modulation technique and generate a frequency spectrum of the received interferometric signal. The controller may be configured to apply a window function, such as a rectangular or smooth, e.g. Gaussian, window, to the interferometric signal prior to generating the frequency spectrum. The controller may be configured to separate the signals corresponding to the respective sensors based on the frequency spectrum and perform interferometric phase evaluation on one or more of the separated signals to determine measurements from the sensors.

According to another aspect of the present disclosure, there is provided an optical sensing method comprising:

supplying laser light from a common laser to a plurality of optical fibre portions, wherein each optical fibre portion comprises a first reflector spaced from a distal end of the optical fibre portion and a second reflector at the distal end, wherein each optical fibre portion further comprises a sensor provided at the distal end, the sensor comprising a third reflector, wherein a distance between the first and second reflectors is different for each of the optical fibre portions;

receiving an interferometric signal from the plurality of optical fibre portions, e.g. at the common detector; and processing the received interferometric signal to determine sensor readings measured by the sensors of the optical fibre portions.

The sensor may be configured such that a physical property between the second and third reflectors varies depending on a parameter being sensed. The physical property may be one or more of dimension (e.g. distance between second and third reflectors), refractive index and absorption (e.g. of matter between second and third reflectors).

The position of the third reflector may vary, e.g. relative to the second reflector, depending on a value of a property being sensed.

The method may further comprise modulating the light supplied by the laser using an optical frequency modulation technique, such as linear, e.g. triangular or sawtooth, or sinusoidal optical frequency modulation.

The light may be modulated using laser diode injection current modulation, diffraction feedback control or using an external frequency modulator, such as an optoacoustic modulator.

The method may comprise generating a frequency spectrum of the received interferometric signal, e.g. by performing a Fourier transform.

The method may comprise distinguishing between the readings from the sensors based on optical path differences associated with the sensors. The optical path difference associated with the sensors may depend on the distance between the first and second reflectors of the corresponding optical fibre portion.

The method may comprise applying a window function, such as a square or rectangular window function or a smooth window function, such as a Gaussian window function, to the interferometric signal received, e.g. prior to generating the frequency spectrum.

The method may comprise separating the signals corresponding to the respective sensors based on the frequency spectrum. The method may further comprise performing interferometric phase evaluation on one or more of the separated signals.

The method may comprise arranging the sensors to measure the property at a plurality of locations.

The sensors may comprise displacement sensors. The method may comprise arranging the sensors to measure displacements of one or more bodies at a plurality of locations.

Alternatively, the sensors may comprise pressure sensors. The method may comprise arranging the sensors to measure pressures at a plurality of locations.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

BRIEF DESCRIPTION OF THE DRAWINGS

For a better understanding of the present invention, and to show more clearly how it may be carried into effect, reference will now be made, by way of example, to the accompanying drawings, in which:

FIG. 4 is a graph showing an example of a simplified frequency spectrum of an interferometric signal received by a detector of the optical interferometry system depicted in FIG. 1.

DETAILED DESCRIPTION

Figure 1:
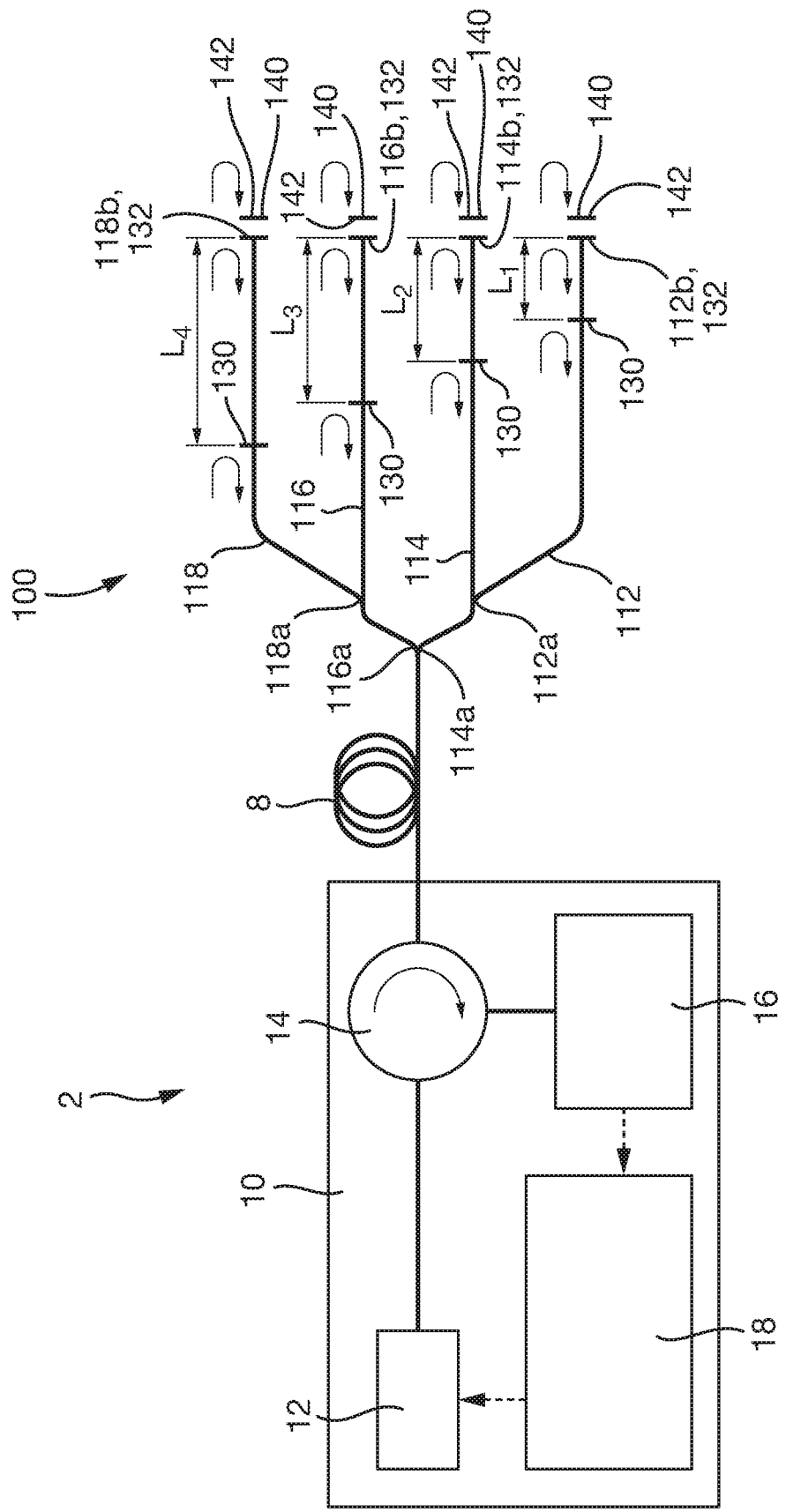
FIG. 1 is a schematic view of an optical interferometry system according to arrangements of the present disclosure.

With reference to FIG. 1, an optical interferometry system 2 according to arrangements of the present disclosure comprises an interrogation unit 10, and a fibre optic sensing device 100.

The interrogation unit 10 comprises a laser 12. The fibre optic sensing device 100 is arranged to receive laser light from the laser 12. The fibre optic sensing device 100 is an interferometric sensing device configured to cause light waves from the laser to interfere with one another in order to produce an interferometric signal.

An optical fibre 8 extends between the interrogation unit 10 and the fibre optic sensing device 100 to carry light waves from the laser 12 to the fibre optic sensing device. The optical fibre 8 is also configured to carry the interferometric signal from the fibre optic sensing device 100 to the interrogation unit 10.

The interrogation unit 10 comprises an optical circulator 14 and a detector 16. The optical circulator 14 is configured to send light from the laser 12 to the optical fibre 8 and to send the interferometric signal from the optical fibre 8 to the detector 16. In other arrangements, the interrogation unit 10 may comprise any other device configured to enable the interferometric signal from the fibre optic sensing device 100 to be separated from the laser light, e.g. being sent by the laser 12, and sent to the detector 16. The detector 16 may comprises a photo detector, or any other sensor capable of detecting the interferometric signal from the fibre optic sensing device 100.

The interrogation unit 10 further comprises a controller 18 configured to process the interferometric signal received by the detector 16 to determine one or more measurements recorded by the fibre optic sensing device 100. In the arrangement depicted in FIG. 1; the controller 18; e.g. a further module of the controller 18, is configured to control the operation of the laser 12. For example, the controller may be configured to modulate the frequency of light provided by the laser 12 as described with reference to FIG. 3a below. Alternatively, the interrogation unit 10 may comprise a further controller configured to control the operation of the laser 12.

In the arrangement depicted in FIG. 1, the optical interferometry system 2 is configured as a self-referencing system. However, in other arrangements, the interrogation unit 10 of the optical interferometry system may comprise a reflector configured to provide a reference signal for the optical interferometry system 2.

The fibre optic sensing device 100 comprises a plurality of optical fibre portions 112, 114, 116, 118 arranged to receive light from the laser 12, e.g. via the optical fibre 8. As depicted in FIG. 1; the fibre optic sensing device 100 comprises first; second, third and fourth optical fibre portions 112, 114, 116, 118. However in other arrangements, the fibre optic sensor device 100 may comprise any desirable number of optical fibre portions.

Each of the optical fibres portions 112; 114, 116; 118 comprises a first reflector 130 provided between a proximal end 112a, 114a, 116a, 118a and a distal end 112b, 114b, 116b, 118b of the respective optical fibre portion. The first reflectors 130 may comprise any form of reflector capable of reflecting a portion of the laser light. For example; the first reflectors 130 may comprise Bragg gratings, fibre voids, an element of reflective material inserted into the fibre, or any other form of reflector.

The first reflector 130 provided in the first optical fibre portion 112 may be spaced from the distal end 112b of the first optical fibre portion by a first distance L1; the first reflector 130 provided in the second optical fibre portion 114 may be spaced from the distal end 114b of the second optical fibre portion by a second distance L2; the first reflector 130 provided in the third optical fibre portion 116 may be spaced from the distal end 116b of the third optical fibre portion by a third distance L3; and the first reflector 130 provided in the fourth optical fibre portion 118 may be spaced from the distal end 118b of the fourth optical fibre portion by a fourth distance L4.

The first, second third and fourth distances L1, L2, L3, L4 may be different from one another. For example, the second distance L2 may be greater than the first distance L1 by an offset distance. Similarly, the third distance L3 may be greater than the second distance L2 by the offset distance and the fourth distance L4 may be greater than the third distance L3 by the offset distance. In other words, the distance between the first reflector and the distal end of each subsequent optical fibre portion provided on the fibre optic sensing device may differ from the previous optical fibre portion by the offset distance such that each of the differences is a multiple of the offset distance. Alternatively, the difference in the distance between the first reflector and the distal end may vary between subsequent optical fibre portions. The distances between the first reflector and the distal end may vary between each of the optical fibre portions by a value which is sufficient to enable the signals corresponding to the respective optical fibre portions to be distinguished from one another in the interferometric signals, as described below.

Each optical fibre portion 112, 114, 116, 118 further comprises a second reflector 132 provided at the distal end 112b, 114b, 116b, 118b of the respective optical fibre portion. In the arrangements depicted, the second reflectors 132 are fibre end surfaces of the optical fibre portions 112, 114, 116, 118. However in other arrangements, the second reflectors 132 comprise any other form of reflector.

Sensors 140 are provided at the distal end 112b, 114b, 116b, 118b of the optical fibre portions 112, 114, 116, 118, e.g. one sensor for each optical fibre portion. The sensors 140 each comprise a third reflector 142 and may be configured such that the position of the third reflector 142 varies depending on the value of a measurement property being sensed. For example, the sensors 140 may comprise vibration sensors and the third reflector 142 may comprise a reflective surface on a body, the vibration of which is being measured. Alternatively, the sensor 140 may comprise a pressure sensor and the third reflector 142 may be provided on a diaphragm or membrane, the position of which varies according to a pressure experienced by the sensor 140. Alternatively again, the sensor 140 may comprise any other desirable type of sensor, such as a temperature sensor or magnetic field sensor.

In an alternative arrangement, the sensors 140 may comprise an optically transparent material that changes its dimensions, refractive index or absorption in response to the value of the measurement property, in order to affect the properties of light passing through the sensor 140 and enable the value of the measurement property to be determined based on the reflected light. For example, the sensor may comprise a temperature sensor comprising an optical material which expands according to temperature, or a magnetic field sensor comprising on optically transparent material exhibiting a Faraday effect.

Two, more than two, or each of the sensors 140 may be similar, e.g. constructed in the same manner, such that the distances between corresponding second and third reflectors 132, 140 are substantially the same when the same value of the measurement property is being sensed. Alternatively, one, more than one, or each of the sensors 140 may differ from the other sensors 140.

The optical fibre portions 112, 114, 116, 118 each form a common path interferometer configured to cause light from the laser 12 travelling along each arm of the interferometer to interfere with the light travelling along each of the other arms to produce interferometric signals. In particular, respective arms of the interferometers may be defined between the first and second reflectors 130, 132, and between the first and third reflectors 130, 142. The interferometric signal produced by the interference of light reflecting from the first, second and third reflectors 130, 132, 142 of each optical fibre portion is received by the detector 16.

Figure 2:
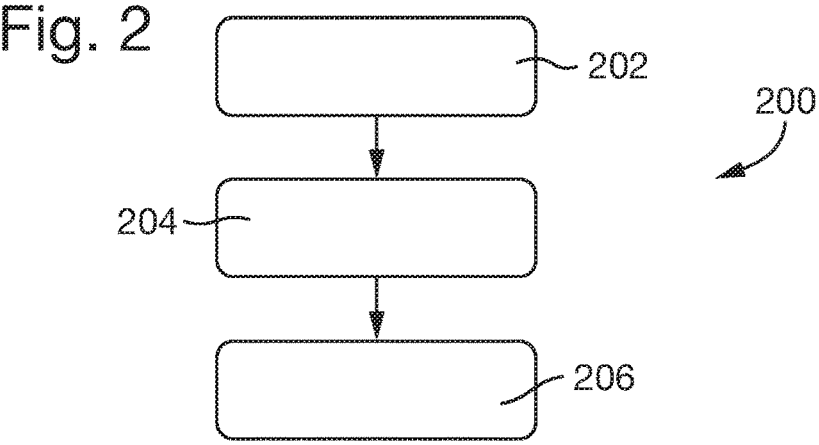
FIG. 2 is a flow chart illustrating an optical sensing method according to arrangements of the present disclosure.

With reference to FIG. 2, the optical interferometry system 2 may be operated according to a method 200.

The method 200 comprises a first step 202, in which laser light is supplied from the laser 12 to the plurality of optical fibre portions 112, 114, 116, 118. The method 200 comprises a second step 204 in which an interferometric signal is received from the plurality of optical fibre portions, e.g. using the detector 16.

The method 200 further comprises a third step 206, in which the received interferometric signal is processed to determine sensor readings measured by the sensors 140 of the optical fibre portions 112, 114, 116, 118.

The method 200 may comprise applying a Range-Resolved Interferometry (RRI) technique to individually identify the information within the interferometric signal corresponding to the interference of light travelling along different arms of the interferometers, e.g. between light reflected by the first, second and third reflectors 130, 132, 143 of each optical fibre portion, and thereby identify the value of the measurement property being sensed by each sensor 140.

RRI allows the interferences of light caused by an interferometer to be distinguished from one another by their Optical Path length Difference (OPD), e.g. the difference in the distance travelled by the light passing along each arm of the interferometer, allowing simultaneous determination of the interferometric phases of multiple interferometers that have been separated based in their differing OPDs. As described above, the distance between the first and second reflectors of each of the optical fibre portions is different, and hence, the OPD of the light reflected by the first and second reflectors 130, 132 and the first and third reflectors 130, 142 differs between each of the optical fibre portions 112. This allows each of the sensors 140 and the measurements they are recording to be separately identified within the interferometric signal, regardless of whether the same or a different value of the measurement property is being sensed.

The RRI technique is performed by modulating the frequency of laser light produced by the laser 12. The frequency of the laser light may be modulated using a linear modulation function, such as a triangular or saw tooth modulation function. Alternatively, as depicted in the top frame of FIG. 3a, the frequency of the laser light may be modulated using a sinusoidal modulation function F1. Using a sinusoidal modulation function may reduce the complexity of the system due to a reduced number of frequency components within the modulation function.

Figure 3A:
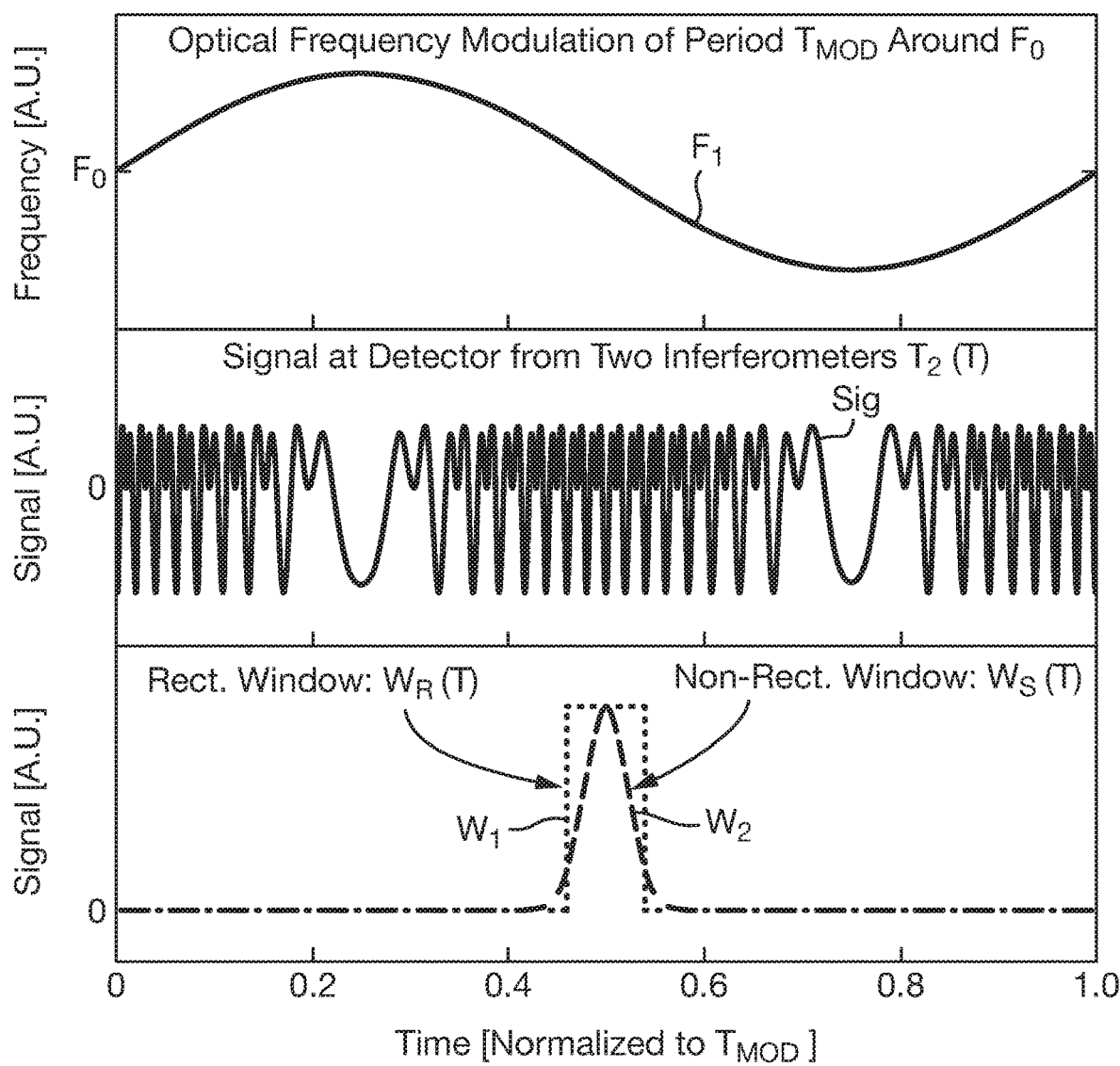
FIGS. 3a and 3b are graphs that are useful for understanding range resolved interferometry.

The middle frame of FIG. 3a depicts an example of an interferometric signal SIG received at a common detector from two interferometers that have been provided with laser light modulated using the modulation function F1. Each of the interferometers is configured to cause interference of the laser light over a different OPD.

The detected interferometric signal SIG may be multiplied by a window function. Two examples of windows functions W1 and W2 are shown in the bottom frame of FIG. 3a, The first window function W1 is a square function and the second window function W2 is a smooth window function, such as a Gaussian window function. It is also envisaged that other window functions may be used as desirable.

Figure 3B:
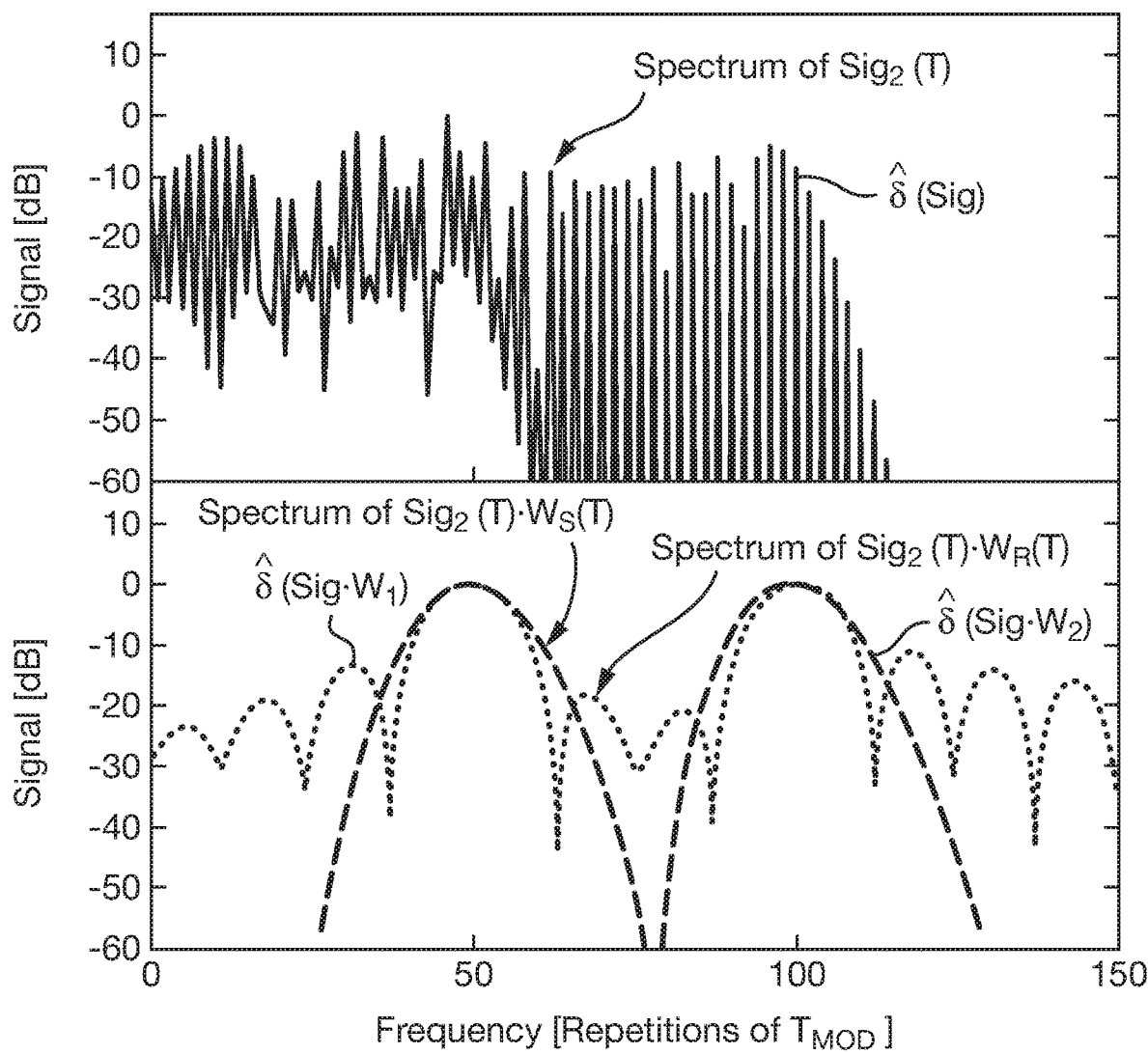

With reference to FIG. 3b, in order to determine the relative OPDs of the two interferometers, the detected interferometric signal is transformed into the frequency domain, e.g. by performing a Fourier transform ($\hat{f}$) of the interferometric signal. Due to the modulation of the laser light sent to the interferometers, the positions of peaks in the frequency spectrum of the interferometric signal correspond to the OPDs of the interferometers.

The top frame of FIG. 3b shows a frequency spectrum $\hat{f}(SIG)$ of the interferometric signal and the bottom frame shows the Frequency spectrums $\hat{f}(SIG \cdot W1)$ and $\hat{f}(SIG \cdot W2)$ of the interferometric signals multiplied by the window function W1 and W2 respectively. As shown, when the smooth window function W2 is applied to the interferometric signal, the peaks in corresponding Frequency spectrum may be more distinct from one another with less interference from side lobes. In the frequency spectrum $\hat{f}(SIG \cdot W2)$, two peaks are present, the frequencies of the peaks corresponding to the OPDs of the two interferometers.

FIG. 4 shows an example of a simplified frequency spectrum $\hat{f}3$ that may be obtained by operating the optical interferometric system 2 depicted in FIG. 1 using the RRI technique. For clarity, only peaks corresponding to interferences between light reflected by the first, second and third reflectors 130, 132, 142 of each of the optical fibre portions respectively have been shown. However, it will be appreciated that other peaks may be present in the frequency spectrum $\hat{f}3$.

The frequency spectrum $\hat{f}3$ includes a plurality of first peaks P1$a$, P1$b$, P1$c$, P1$d$, which correspond to interference between light reflecting from the second and third reflectors 132, 142 of each of the optical fibre portions.

In some arrangements, two or more of the first peaks P1a, P1b, P1c, P1d may be at substantially the same frequency, e.g. due to two or more of the sensors 140 recording substantially the same value of the measurement property. Even when different values are being recorded by each of the sensors, the differences between the values recorded by the sensors 140 may be small, such that it is difficult to determine each of the values, due to interference between the peaks. Furthermore, it may not be possible to determine which of the peaks corresponds to which of the sensors 140 based on the first peaks P1a, P1b, P1c, P1d.

As depicted, the frequency spectrum f3 further comprises a second peak P2. The second peak may correspond to interference between light reflecting from the first and second reflectors 130, 132 of the first optical fibre portion 112, e.g. interference over an OPD of L1. A third peak P3 may correspond to interference of light reflecting from the first and third reflectors 130, 142 of the first optical fibre portion 112.

The value of the measurement property recorded by the sensor 140 of the first optical fibre portion 112 can therefore be determined by evaluating the difference of the signals from the second and third peaks P2, P3, which may be sufficiently separated to allow these signals to be unambiguously determined. Furthermore, it can be determined that the value of the measurement property determined from the second and third peaks P2, P3 relates to the first optical fibre portion 112 due to the frequency of the second peak P2 and its correspondence with an OPD of L1.

The frequency spectrum f3 further comprises fourth and fifth peaks P4, P5, sixth and seventh peaks P6, P7 and eighth and ninth peaks P8, P9, which correspond to interference between light reflecting from the first and second reflectors 130, 132 and the first and third reflectors 130, 142 of the second, third and fourth optical fibre portions 114, 116, 118 respectively. Each of the pairs of peaks corresponding to a particular one of the optical fibre portions can be identified based on the unique distance between the first and second reflectors.

Since the difference in the OPDs between the first and second reflectors and the first and third reflectors may be relatively large compared to the difference in the OPDs between the second and third reflectors of each of the optical fibre portions, the third peak P3 may be separated from the second peak P2 by a greater frequency spacing than the spacing between the first peaks. In particular, the third peak P3 is sufficiently separated from the second peak P2 to avoid interference between the peaks. The fourth and fifth peaks P4, P5, sixth and seventh peaks P6, P7 and eighth and ninth peaks P8, P9 may similarly be separated by greater distances than the first peaks. Providing the first reflectors within the optical fibre portions therefore allow the values of the measurement property being sensed by each of the sensors to be determined from the interferometric signal with less interference from other peaks within the frequency spectrum.

Furthermore, since each of the values of the sensors measurements is determined using interferences between reflections from the first reflector and the second and third reflectors, each of the measurement values can be associated with the corresponding optical fibre portion based on the distance between the first reflector and the second reflector.

The offset distance, e.g. the difference in the distance between the first and second reflectors of each subsequent optical fibre portion provided in the fibre optic sensing device, may be greater than a maximum distance between the second the third reflectors of one, more than one or each of the optical fibre portions, e.g. when a maximum or minimum value of the measurement property is being sensed by the sensor 140. Hence, the separations between the second and third peaks, the fourth and fifth peaks and the sixth and seventh peaks may be less than the separations between the second, fourth, sixth and eighth peaks. Interference between the signals, e.g. interferometric signals, generated by each of the optical fibre portions may therefore be reduced.

Use of the fibre optic sensing device 100 together with the range-resolved interferometry technique described above therefore allows a single interrogation unit 10 comprising a single laser 12 and a single detector 16 to be used to determine a plurality of sensor readings, based on the evaluation of the interferometric phase from a plurality of interferometric sensors, and to identify which of the sensors each reading corresponds to.

In the arrangement depicted in FIG. 1, the second and third optical fibre portions 114, 116 branch from the optical fibre 8, and the first and fourth optical fibre portions 112, 118 branch from the second and third optical fibre portions respectively, e.g. between the proximal and distal ends 110a, 110b of the second and third optical fibre portions. In particular, the first and fourth optical fibre portions may branch from the second and third optical fibre portions at positions between the proximal ends 114a, 116a and the first reflectors 130. However, in other arrangements, each of the optical fibre portions 112, 114, 116, 118 may branch from the same point. In other words the proximal ends 112a, 114a, 116a, 118a of each of the optical fibre portions may be coincident.

Figure 5A:
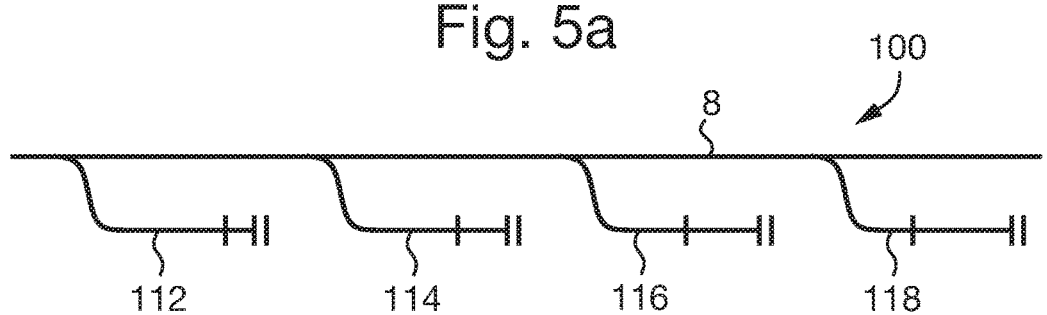
FIGS. 5a, 5b and 5c are schematic views of fibre optic sensing devices according to arrangements of the present disclosure.

With reference to FIG. 5a in other arrangements, each of the optical fibre portions 112, 114, 116, 118 may branch from the optical fibre 8. In the arrangement shown in FIG. 5a, each of the optical fibre portions branches from a different branch point along the length of the optical fibre 8.

A coupling ratio of the light from the optical fibre 8 to each of the optical fibre portions at the branch may vary along the length of the optical fibre 8. In particular, the coupling ratio may increase along the length of the optical fibre as the distance from the laser 12 increases, such that the intensity of light provided to and/or received from each optical fibre portion is substantially the same.

In other arrangements, two or more of the optical fibre portions may branch from the optical fibre 8 at the same point.

In the arrangement shown in FIG. 5a, the optical fibre 8 is not branched. However, in other arrangements, such as the arrangement depicted in FIG. 5b, the optical fibre 8, may comprise one or more branches, such that the optical fibre 8 comprises a plurality of distal ends 8b. The optical fibre 8 may branch into two at each branch point along the optical fibre. Alternatively, the optical fibre 8 may branch into three, four or more than four branches at one, more than one or each of the branch points along the optical fibre 8. One or more of the optical fibre portions may be coupled to each of the distal ends 8b of the optical fibre 8.

Figure 5B:
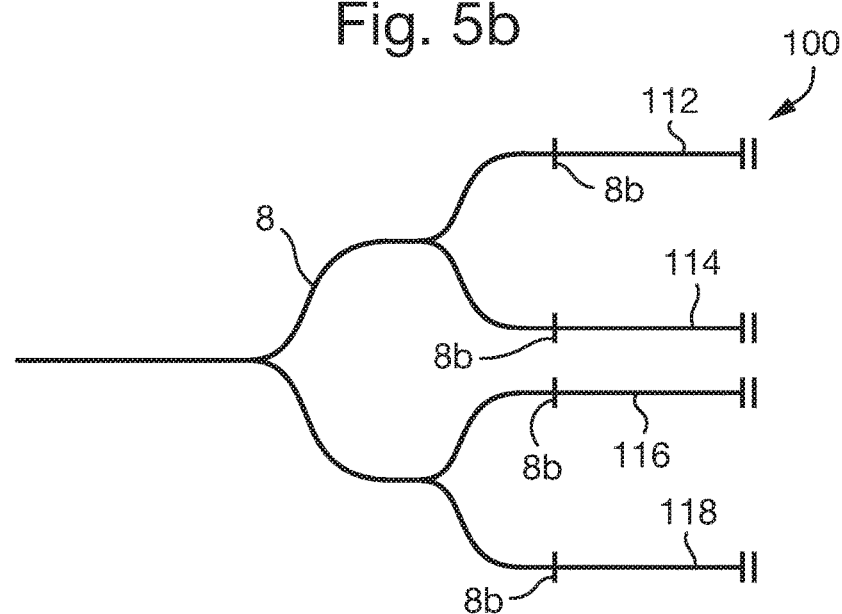
Figure 5C:
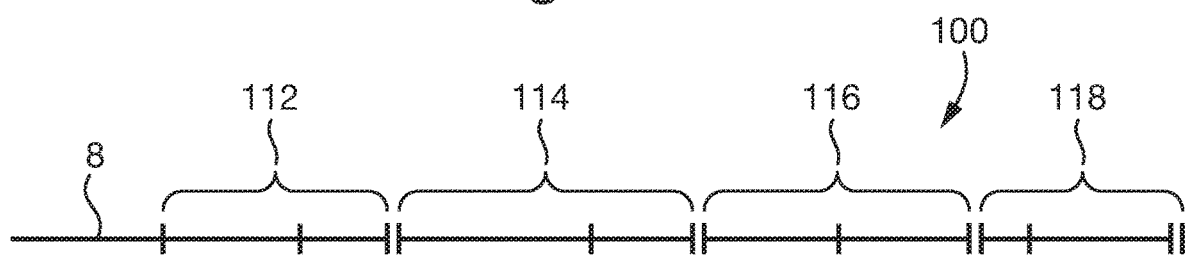

In the arrangements depicted in FIGS. 5a and 5b, the optical fibre portions are arranged in parallel with one another. However, as depicted in FIG. 5c, in other arrangements, two or more of the optical fibre portions may be arranged in series with one another, such that light passes through the two or more optical fibre portions sequentially. In this case, the third reflectors provided in the series connected optical fibre portions may be partially transparent such that a portion of the light passes through the third reflectors to the subsequent optical fibre portions.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

The invention claimed is:

1. A fibre optic sensing device comprising:
a plurality of optical fibre portions, wherein:
each optical fibre portion is arranged to receive laser light from a common laser and reflect the laser light to a common detector;
each optical fibre portion comprises a first reflector spaced from a distal end of the optical fibre portion and a second reflector at the distal end;
each optical fibre portion comprises a sensor provided at the distal end of the optical fibre portion, the sensor comprising a third reflector; and
a distance between the first and second reflectors is different for each of the optical fibre portions.

2. The fibre optic sensing device according to claim 1, wherein the sensor is configured such that a physical property between the second and third reflectors varies depending on a parameter being sensed.

3. The fibre optic sensing device according to claim 2, wherein the physical property is one or more of dimension, refractive index, and absorption.

4. The fibre optic sensing device according to claim 1, wherein two or more of the sensors are constructed in the same manner such that the distances between corresponding second and third reflectors are substantially the same when the same value of the measurement property is being sensed.

5. The fibre optic sensing device according to claim 1, wherein the first reflector comprises a Bragg grating.

6. The fibre optic sensing device according to claim 1, wherein the second reflector comprises a fibre end surface of the optical fibre portion.

7. The fibre optic sensing device according to claim 1, wherein the sensors are displacement or vibrations sensors, pressure sensors, temperature sensors, or magnetic field sensors.

8. The fibre optic sensing device according to claim 1, wherein the optical fibre portions are arranged in series with one another.

9. The fibre optic sensing device according to claim 1, wherein the optical fibre portions are arranged in parallel with one another.

10. The fibre optic sensing device according to claim 1, wherein the sensing device further comprises an optical fibre configured to supply the laser light to the optical fibre portions.

11. The fibre optic sensing device according to claim 10, wherein one, more than one, or each of the optical fibre portions branch from the optical fibre.

12. The fibre optic sensing device according to claim 1, wherein one or more of the optical fibre portions branch from others of the optical fibre portions.

13. The fibre optic sensing device according to claim 1, wherein the optical fibre comprises one or more branch points, such that the optical fibre comprises a plurality of branches extending to a plurality of distal ends of the optical fibre respectively, and wherein one or more of the optical fibre portions are coupled to the optical fibre at the distal ends.

14. The fibre optic sensing device according to claim 13, wherein the optical fibre branches into two branches at each of the branch points.

15. The fibre optic sensing device according to claim 1, wherein one or more of the optical fibre portions branch from the optical fibre at different points along the length of the optical fibre.

16. An optical interferometry system comprising, a laser and a fibre optic sensing device according to claim 1.

17. The optical interferometry system according to claim 16, wherein the system further comprises a modulator configured to apply optical frequency modulation to the laser.

18. The optical interferometry system according to claim 16, wherein the optical interferometry system is configured as a self-referencing interferometry system.

19. The optical interferometry system according to claim 16, wherein the system further comprises a common detector configured to receive an interferometric signal from the optical fibre portions.

20. The optical interferometry system according to claim 16, wherein the system further comprises a controller configured to process an interferometric signal using a range-resolved interferometry technique.

21. An optical sensing method comprising the steps of:
(a) supplying laser light from a common laser to a plurality of optical fibre portions, wherein each optical fibre portion includes a first reflector spaced from a distal end of the optical fibre portion and a second reflector at the distal end, wherein each optical fibre portion further comprises a sensor provided at the distal end, the sensor comprising a third reflector, wherein a distance between the first and second reflectors is different for each of the optical fibre portions;
(b) receiving an interferometric signal from the plurality of optical fibre portions; and
(c) processing the received interferometric signal to determine sensor readings measured by the sensors of the optical fibre portions.

* * * * *